United States Patent [19]

Nicholson

[11] 4,208,388
[45] Jun. 17, 1980

[54] FLOW AID

[75] Inventor: William R. Nicholson, Midland, Mich.

[73] Assignee: Dow Corning Corporation, Midland, Mich.

[21] Appl. No.: 946,485

[22] Filed: Sep. 28, 1978

[51] Int. Cl.² .............................................. C01F 11/02
[52] U.S. Cl. ..................................... 423/268; 423/636
[58] Field of Search ................ 423/268, 175, 177, 636

[56] References Cited

U.S. PATENT DOCUMENTS

| | | | |
|---|---|---|---|
| 2,866,760 | 12/1958 | Haessler et al. | 423/268 |
| 4,026,991 | 5/1977 | Chamberlain | 423/177 |

Primary Examiner—O. R. Vertiz
Assistant Examiner—Wayne A. Langel
Attorney, Agent, or Firm—Michael F. Borun

[57] ABSTRACT

The flowability of particulate lime is enhanced by treatment with effective amounts of selected fluid polymethylhydrogensiloxanes, polydimethylsiloxanes, and/or mixtures thereof.

10 Claims, No Drawings

FLOW AID

BACKGROUND

The present invention relates generally to enhancing the flowability of particulate lime and more particularly to treatment of lime with effective amounts of selected fluid polymethylhydrogensiloxanes, polydimethylsiloxanes and/or mixtures thereof.

Limestone is a generic term designating rock comprising carbonate forms of calcium and magnesium ($CaCO_3$ and $MgCO_3$) along with varying percentages of impurities. Limestone is generally classified into three types on the basis of magnesium carbonate content: (1) "high-calcium" having no more than 5% $MgCO_3$; (2) "magnesian" having 5–20% $MgCO_3$; and (3) "dolomitic" having from 20–45.6% $MgCO_3$. When subjected to high temperature kilning, limestone decomposes chemically into calcium oxide (CaO) and magnesium oxide (MgO) with the expulsion of carbon dioxide. This primary product, known as "quicklime", may be hydrated or slaked into "hydrated lime". Limes, including quicklime and hydrated lime, calcined from the above-noted limestone types are accordingly designated as high calcium, magnesian and dolomitic limes. Limes are also characterized as "vertical kiln", "calcimatic", and "rotary" on the basis of apparatus employed in kilning.

Quicklime and hydrated lime are susceptible to a great variety of uses, including, for example, use in refractory processes, flux and steel manufacture, pulp and paper manufacture, water treatment, glass making, non-ferrous metallurgical processing, waste treatment, petroleum refining and the like. See, generally, Kirk-Othmer, "Encyclopedia of Chemical Technology" 2nd Ed. Volume 12, pp. 414–459 (John Wiley & Sons, New York, 1967).

Numerous prior patents are of interest to the background of the invention. U.S. Pat. No. 2,866,760 proposes the use of highly porous catalysts to effect polymerization (i.e. crosslinking) of polysiloxanes to provide a waterproof coating on the surface of particles. U.S. Pat. Nos. 3,009,775 and 3,174,825 disclose preparation of water insoluble iron cyanide crystals by treatment with liquid organopolysiloxanes and then propose that small quantities of such treated crystals may be added to sodium chloride so as to reduce the tendency toward caking of the salt. U.S. Pat. No. 3,980,593 discloses silanes as components of yet another iron cyanide treatment of salt. U.S. Pat. No. 3,930,062 discloses the usefulness of alkoxysilanes to enhance the flowability of porcelain enamel frits. Most recently, U.S. Pat. No. 4,007,050 discloses rendering metal oxides hydrophobic by means of fluidized bed treatment at high temperatures with combinations of polyorganosiloxanes and organohalosilanes. Once again, the prior art treatments are generally seen to involve costly reagents and catalysts as well as time-consuming, expensive processing.

There exists, therefore, an ongoing need in the art for improved methods for enhancing flowability of particulate materials, including lime, which methods involve use of relatively inexpensive quantities of treating materials and relatively fewer and simpler process steps.

BRIEF SUMMARY

According to the present invention it has been discovered that particulate lime, including quicklime and hydrated lime, can be simply and economically treated to substantially enhance flowability characteristics. Practice of the invention includes the step of applying (by pouring, spraying or the like) certain selected siloxane fluids to the lime in particulate form or during grinding to particulate form. Suitable siloxane fluids have a viscosity of from about 0.65 to about 1000 centistokes at 25° C, and are selected from the group consisting of trimethylsilyl-endblocked polymethylhydrogensiloxanes, trimethylsilyl-endblocked polydimethylsiloxanes and hydroxyl-endblocked polydimethylsiloxanes. The above-mentioned fluids have been found to be remarkably effective in enhancing flowability of lime, most notably quicklime, when applied at extremely low levels, ranging from about 0.025 to about 0.5 parts by weight based upon one hundred parts by weight of lime. Even more remarkably, the fluids provide effective enhancement of lime flowability when applied at ambient temperatures of from 5° to 50° C., in the absence of any prior or subsequent elevation of temperatures, elevation of pressure, addition of chemical catalysts and crosslinking agents, use of solvent carriers or provision of other treatment conditions and components that have been employed in the prior art to crosslink silicon compounds and/or react them with the surfaces of particles. Finally, the enhancement of flowability of lime brought about through practice of the invention is an enduring characteristic capable of withstanding the passage of long periods of time and exposure of treated particles to an atmosphere of high relative humidity.

Other aspects and advantages of the invention will become apparent upon consideration of the following detailed description of preferred embodiments thereof.

DETAILED DESCRIPTION

According to the invention there is provided a method for treatment of lime to enhance the flowability thereof. The first step in practice of the invention is the application to the lime of from 0.025 to about 0.5, and preferably 0.1, parts by weight (per hundred parts by weight lime) of a selected fluid siloxane.

The fluid siloxane has a viscosity of from about 0.65 to about 1000 centistokes at 25° C. and preferably has a viscosity of from about 20 to 500 centistokes. Suitable siloxanes for practice of the invention include siloxanes selected from the group consisting of trimethylsilyl-endblocked polymethylhydrogensiloxane, trimethylsilyl-endblocked polydimethylsiloxane and hydroxyl-endblocked polydimethylsiloxane. Mixtures of the above-mentioned siloxanes may also be employed. Especially preferred are mixtures of trimethylsilyl-endblocked polymethylhydrogensiloxan and hydroxyl-endblocked polydimethylsiloxane. Because each component of such mixtures is individually effective in practice of the invention, one may incorporate a variety of ratios of parts by weight of component siloxanes in preparing the mixtures.

Preferred siloxanes for practice of the invention include: trimethylsilyl-endblocked polymethylhydrogensiloxanes having a viscosity of about 30 centistokes; trimethylsilyl-endblocked polydimethylsiloxanes having a viscosity of from about 100 to about 300 centistokes; and hydroxyl-endblocked polymethylsiloxanes having a viscosity of about 80 centistokes.

Application of the selected siloxane fluid to the lime may be by simple pouring, spraying, or such related techniques as aerosol spraying with suitable aerosol carriers. Application may be effected directly to particulate lime, preferably quicklime, of a desired particle size or the fluid may be applied to lime in a process of grinding lime from a larger to a smaller particle size.

After the application step, the fluid and lime are thoroughly mixed—using simple, inexpensive equipment—to permit an intimate contact of the fluid with the lime surface. Mixing may be carried out in any suitable container such as, for example, a rotating cylindrical drum provided with internal vanes or blades. Of course, if application of the siloxane fluid is carried out during grinding, no separate apparatus is needed. It is significant, once again, that no heating or other pre-treatment of the lime is necessary to secure enhancement of lime flowability and that no post-application treatment other than mixing is required.

The precise mode of operation of the silicone fluids in enhancing flowability of lime according to the invention is not fully ellucidated. It is believed by some, for example, that the tendency toward agglomeration in lime particles is a result of electrostatic forces. Treatment according to the invention, then, may simply serve to "mask" such forces. An alternative proposal of the mechanism of action of the fluids is that they react with lime surface water and/or hydroxyl groups through covalent or polar bonding and thus minimize the potential for interreaction between water molecules on adjacent particles. Still another proposed mechanism of action for the fluids as enhancers of flowability involves the proposal that the highly alkaline nature of the surface of the lime particles functions to catalyze or "cure" the siloxanes to higher viscosity siloxanes or resins despite the absence of traditional chemical and physical conditions for such reactions. According to such a mechanism, polymethylhydrogensiloxanes would be "cured" to a resinous form and hydroxyl-endblocked siloxanes would undergo "chain extension" to form more viscous siloxanes on the particle surface. Left unexplained by the last two proposed mechanisms is the character of alteration or reaction of molecules of notably "unreactive" trimethylsilyl-endblocked polydimethylsiloxane which is demonstrably quite effective in practice of the invention.

Knowledge of the precise mode of operation of fluids employed according to the invention is, of course, not essential to its successful practice. Whatever mechanism may be involved, application and intimate contact of very small quantities of the selected siloxane fluids with the lime serves to markedly enhance flowability when carried out at ambient processing temperatures of from about 5° to about 50° C. and without any of the prior art treatment conditions. Put another way, practice of the invention proceeds rapidly and effectively in the absence of use of special equipment or special additives, reagents, or conditions employed in the past to crosslink or interreact silicon compound molecules with each other or with reactive moieties on the particle surface.

The following example of practice of the invention is provided for illustrative purposes and provides no limitation upon its scope.

EXAMPLE 1

Enhancement of flowability of lime according to the invention is demonstrated by the following description of treatments of various types of lime.

A. Treatment Materials

Siloxane fluids employed as treating materials in this example are the following.

Fluid No. 1
Trimethylsilyl-endblocked polymethylhydrogensiloxane having a viscosity of about 30 centistokes at 25° C.

Fluid No. 2
Trimethylsilyl-endblocked polydimethylsiloxane having a viscosity of about 350 centistokes at 25° C.

Fluid No. 3
Trimethylsilyl-endblocked polydimethylsiloxane having a viscosity of about 100 centistokes at 25° C.

Fluid No. 4
Hydroxyl-endblocked polydimethylsiloxane having a viscosity of about 80 centistokes at 25° C.

Fluid No. 5
A mixture of equal parts by weight of Fluid No. 1 and Fluid No. 4 having a viscosity of about 60 centistokes at 25° C.

Fluid No. 6
A mixture of 10 parts by weight of Fluid No. 1 and 90 parts by weight of Fluid No. 4 having a viscosity of about 75 centistokes at 25° C.

B. Lime

A variety of lime types are treated in this example including those classified (according to mode of conversion from limestone) as "vertical", "calcimatic", and "rotary" lime of the high calcium and dolomitic types. Specific limes include:

Lime No. 1
"Mississippi Lime Company, Vertical Kiln", a high calcium vertical lime having a particle size of about 200 to 325 mesh (Tyler screen).

Lime No. 2
"BeachviLime Limited, Calcimatic" a high calcium, calcimatic lime having a particle size of about 48 mesh (Tyler screen).

Lime No. 3
"BeachviLime Limited, Rotary", a high calcium rotary lime having a particle size of about 48 mesh (Tyler screen).

Lime No. 4
"Warner Company, Rotary", a high calcium rotary lime having a particle size of about 200 to 325 mesh (Tyler screen).

Lime No. 5
"The J. E. Baker Company, Dead-Burned Dolomite Rotary", a dolomitic rotary lime having a particle size of about 100 mesh (Tyler screen).

Lime No. 6
"Australian Iron & Steel Pty. Ltd. Dolomite", a dolomitic lime having a particle size of about 200 to 325 mesh (Tyler screen).

C. Treatment Methods

Alternative and essentially equivalent methods of treatment according to this example are as follows. According to a first method, 100 grams of the lime is placed in a commercial blender. The siloxane fluid is added with an eye dropper and the lime and fluid are mixed at moderate speed for five minutes. According to a second method, 200 g of lime is placed in a one gallon drum provided with vertical blades. The fluid is added through a small opening by means of an aerosol system employing chloroethane, and/or Freon carrier material. The drum is then placed on a bottle roller and rotated for about five minutes.

D. Flowability Testing

The test procedure employed in this example is a variation of the "Davison Flow Test" published in literature entitled, "Syloid ® Conditioning Agents for the Food Industry". In general, the process involves measurement of the time required for fifty grams of lime to flow through a vibrating funnel. The Pyrex ® funnel employed has a volume of 240 cc, an angle of 60°, a top opening inner diameter of 9.9 cm, a 3 cm long stem with a 1.5 cm inner diameter, and an overall length of 11.2 cm. As the treated or untreated control lime is released from the funnel, the funnel is subjected to vibration by an iron supporting ring attached to a Syntron ®, model FC-TO Vibra-Drive feeder on a 60 dial setting.

E. Test Results

The following Tables 1 through 6 provide flowability test data for limes treated using the methods and materials described above. The amount of fluid employed is specified as an "add-on percentage" numerically corresponding to the number of parts by weight employed to treat one hundred parts by weight lime.

TABLE I

| Treatment Material | Flowability of Lime No. 1 | |
|---|---|---|
| | Add-On Percentage | Flow Time (Sec)/50g Sample |
| Fluid No. 1 | 0.1 | .7 |
| Fluid No. 5 | 0.1 | .8 |
| Fluid No. 4 | 0.1 | .8 |
| Fluid No. 6 | 0.1 | .9 |
| Fluid No. 2 | 0.1 | 1.0 |
| Fluid No. 4 | 0.2 | 1.3 |
| Untreated Control | — | 15.2 |

TABLE 2

| Treatment Material | Flowability of Lime No. 2 | |
|---|---|---|
| | Add-On Percentage | Flow Time (Sec)/50g Sample |
| Fluid No. 1 | 0.1 | 5.4 |
| Fluid No. 5 | 0.1 | 6.5 |
| Fluid No. 6 | 0.1 | 6.5 |
| Fluid No. 4 | 0.1 | 10.5 |
| Untreated Control | — | 17.7 |

TABLE 3

| Treatment Material | Flowability of Lime No. 3 | |
|---|---|---|
| | Add-On Percentage | Flow Time (Sec)/50g Sample |
| Fluid No. 5 | 0.1 | 1.9 |
| Fluid No. 1 | 0.1 | 2.3 |
| Fluid No. 4 | 0.1 | 5.5 |
| Fluid No. 6 | 0.1 | 8.7 |
| Fluid No. 2 | 0.1 | 10.2 |
| Untreated Control | — | 17.9 |

TABLE 4

| Treatment Material | Flowability of Lime No. 4 | |
|---|---|---|
| | Add-On Percentage | Flow Time (Sec)/50g Sample |
| Fluid No. 1 | 0.1 | .9 |
| Fluid No. 4 | 0.1 | 1.0 |
| Fluid No. 5 | 0.1 | 1.4 |
| Fluid No. 6 | 0.1 | 2.2 |
| Fluid No. 2 | 0.1 | 8.6 |
| Untreated Control | — | 19.5 |

TABLE 5

| Treatment Material | Flowability of Lime No. 5 | |
|---|---|---|
| | Add-On Percentage | Flow Time (Sec)/50g Sample |
| Fluid No. 1 | 0.1 | .9 |
| Fluid No. 5 | 0.1 | 1.9 |
| Fluid No. 6 | 0.1 | 2.2 |
| Fluid No. 2 | 0.1 | 2.3 |
| Fluid No. 4 | 0.1 | 3.6 |
| Untreated Control | — | 7.6 |

TABLE 6

| Treatment Material | Flowability of Lime No. 6 | |
|---|---|---|
| | Add-On Percentage | Flow Time (Sec)/50g Sample |
| Fluid No. 4 (200 Mesh Lime) | 0.1 | 1.5 |
| Untreated Control (200 Mesh Lime) | — | 7.3 |
| Fluid No. 4 (325 Mesh Lime) | 0.1 | 1.6 |
| Untreated Control (325 Mesh Lime) | — | 8.6 |

The following Tables illustrate the effectiveness of treatment according to the invention upon exposure of treated lime to an atmosphere of high relative humidity. Each Table indicates the increment in weight due to moisture pick up as a percentage of original weight.

TABLE 7

| Treatment Material | Moisture Pick-Up and Flowability of Lime No. 2 After 79 Hr at 81% Relative Humidity | | |
|---|---|---|---|
| | Add-On Percentage | Moisture % Pick-Up | Flow Time (Sec)/50g Sample |
| Fluid No. 1 | 0.1 | 1.8 | 2.8 |
| Fluid No. 5 | 0.1 | 2.0 | 3.0 |
| Fluid No. 4 | 0.1 | 2.2 | 5.1 |
| Fluid No. 2 | 0.1 | 2.0 | 11.2 |
| Untreated Control | — | 2.1 | 20.8 |

TABLE 8

| Treatment Material | Moisture Pick-Up And Flowability of Lime No. 3 After 58 Hr at 100% Relative Humidity | | |
|---|---|---|---|
| | Add-On Percentage | % Pick-Up | Flow Time (Sec)/50g Sample |
| Fluid No. 1 | 0.1 | 2.3 | 1.1 |
| Fluid No. 5 | 0.1 | 2.9 | 1.1 |
| Fluid No. 2 | 0.1 | 2.5 | 2.4 |
| Fluid No. 4 | 0.1 | 2.3 | 3.3 |
| Untreated Control | — | 2.6 | 18.8 |

Similarly dramatic enhancement of lime flowability has been observed upon addition of identically low add-on percentages of the selected siloxane fluids to lime in the process of grinding to a small particle size.

Numerous modifications and variations in practice of the invention are expected to occur to those skilled in the art upon consideration of the foregoing disclosure. Consequently, only such limitations as appear in the appended claims should be placed thereon.

What is claimed is:

1. A method for treatment of lime to enhance the flowability thereof, said method consisting of the steps of:
   (a) applying to the lime to be treated from about 0.025 to about 0.5 parts by weight, based on 100 parts by weight of lime, of a fluid siloxane having a viscosity of from about 0.65 to about 1000 centistokes and selected from the group consisting of trimethylsilyl-endblocked polymethylhydrogensiloxane, trimethysilyl-endblocked polydimethylsiloxane, hydroxyl-endblocked polydimethylsiloxane, and mixtures thereof; and, (b) intimately contacting said fluid with the lime to form a treated lime having enhanced flowability compared to untreated lime, the foregoing steps being performed at ambient temperature of from 5° to 50° C. and in the absence of added catalyst.

2. The method of claim 1 wherein said siloxane fluid is applied and intimately contacted with the lime concurrently during the step of grinding the lime from a larger particle size to a smaller particle size.

3. The method of claim 1 or 2 wherein the quantity of said siloxane fluid applied is about 0.1 parts by weight per 100 parts by weight of lime.

4. The method of claim 1 or 2 wherein the viscosity of said siloxane fluid is from about 20 to about 500 centistokes.

5. The method of claim 1 or 2 wherein said siloxane fluid is a trimethylsilyl-endblocked polymethylhydrogensiloxane having a viscosity of about 30 centistokes.

6. The method of claim 1 or 2 wherein said siloxane fluid is a trimethylsilyl-endblocked polydimethylsiloxane having a viscosity of from about 100 to about 350 centistokes.

7. The method of claim 1 or 2 wherein said siloxane fluid is a hydroxyl-endblocked polydimethylsiloxane having a viscosity of about 80 centistokes.

8. The method of claim 1 or 2 wherein said siloxane fluid is a mixture of a trimethylsilyl-endblocked polymethylhydrogensiloxane and a hydroxyl-endblocked polydimethylsiloxane.

9. The method of claim 8 wherein said mixture comprises equal parts by weight of said trimethylsilyl endblocked polymethylhydrogensiloxane and hydroxyl endblocked polydimethylsiloxane.

10. The method of claim 8 wherein said mixture comprises 1 part by weight of said trimethylsilyl endblocked polymethylhydrogensiloxane and 9 parts by weight of said hydroxyl endblocked polydimethylsiloxane.

* * * * *